US010783609B2

(12) United States Patent
Aflaki Beni

(10) Patent No.: US 10,783,609 B2
(45) Date of Patent: Sep. 22, 2020

(54) METHOD AND APPARATUS FOR PROCESSING VIDEO INFORMATION

(71) Applicant: Nokia Technologies Oy, Espoo (FI)

(72) Inventor: Payman Aflaki Beni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 16/082,613

(22) PCT Filed: Feb. 14, 2017

(86) PCT No.: PCT/FI2017/050085
§ 371 (c)(1),
(2) Date: Sep. 6, 2018

(87) PCT Pub. No.: WO2017/158229
PCT Pub. Date: Sep. 21, 2017

(65) Prior Publication Data
US 2019/0066263 A1    Feb. 28, 2019

(30) Foreign Application Priority Data

Mar. 17, 2016  (GB) .................................. 1604504.9

(51) Int. Cl.
*G06K 9/00* (2006.01)
*G06T 3/40* (2006.01)
(Continued)

(52) U.S. Cl.
CPC .......... *G06T 3/4023* (2013.01); *G06T 3/4038* (2013.01); *G06T 7/13* (2017.01);
(Continued)

(58) Field of Classification Search
None
See application file for complete search history.

(56) References Cited

U.S. PATENT DOCUMENTS

| 7,027,642 B2* | 4/2006 | Rubbert ................ A61C 7/00 382/154 |
| 7,623,682 B2 | 11/2009 | Park et al. |

(Continued)

FOREIGN PATENT DOCUMENTS

| WO | 2006/054200 A1 | 5/2006 |
| WO | 1677534 A1 | 7/2006 |
| WO | 2015/067153 A1 | 5/2015 |

OTHER PUBLICATIONS

Extended European Search Report received for corresponding European Patent Application No. 17765912.5, dated Jul. 10, 2019, 3 pages.

(Continued)

*Primary Examiner* — Hadi Akhavannik
(74) *Attorney, Agent, or Firm* — Harrington & Smith

(57) ABSTRACT

There are disclosed various methods, apparatuses and computer programs for processing video information. In an embodiment of the method for encoding video information an image having a first edge and a second edge is obtained and a location suitable for a division boundary for dividing the image into a first part and a second part is searched. The image is rearranged by exchanging the order of the first part and the second part to obtain a reconstructed original image; and an indication of a location of the division boundary is provided. In an embodiment of the method for decoding video information an image obtained from an original image is received. The image has a first edge and a second edge. Also information indicative of a location of a division boundary is received. The division boundary divides the image into a first part and a second part. The image is rearranged by exchanging the order of the first part and the second part to obtain a reconstructed original image.

20 Claims, 8 Drawing Sheets

(51) Int. Cl.

| | | |
|---|---|---|
| *H04N 19/88* | (2014.01) | |
| *H04N 19/182* | (2014.01) | |
| *H04N 19/102* | (2014.01) | |
| *H04N 19/172* | (2014.01) | |
| *H04N 19/85* | (2014.01) | |
| *H04N 19/14* | (2014.01) | |
| *H04N 19/139* | (2014.01) | |
| *G06T 7/564* | (2017.01) | |
| *G06T 7/13* | (2017.01) | |
| *G09G 3/00* | (2006.01) | |
| *H04N 19/80* | (2014.01) | |

(52) U.S. Cl.
CPC ............ *G06T 7/564* (2017.01); *G09G 3/007* (2013.01); *H04N 19/102* (2014.11); *H04N 19/139* (2014.11); *H04N 19/14* (2014.11); *H04N 19/172* (2014.11); *H04N 19/182* (2014.11); *H04N 19/85* (2014.11); *H04N 19/88* (2014.11); *H04N 19/80* (2014.11)

(56) References Cited

U.S. PATENT DOCUMENTS

| | | | | |
|---|---|---|---|---|
| 9,025,885 | B2* | 5/2015 | Alpert | .................... G06K 9/481 |
| | | | | 382/197 |
| 2005/0151837 | A1* | 7/2005 | Cutler | ................... G06T 3/0062 |
| | | | | 348/36 |
| 2008/0218587 | A1 | 9/2008 | Glatt | |
| 2010/0171764 | A1 | 7/2010 | Feng et al. | |
| 2011/0175796 | A1 | 7/2011 | Pedro | |
| 2011/0211040 | A1 | 9/2011 | Lindemann et al. | |
| 2012/0163725 | A1* | 6/2012 | Fukuhara | ............. H04N 19/597 |
| | | | | 382/232 |
| 2014/0043368 | A1 | 2/2014 | Yu | |
| 2016/0063705 | A1* | 3/2016 | Xu | ............................ G06T 5/50 |
| | | | | 382/199 |

OTHER PUBLICATIONS

Office action received for corresponding European Patent Application No. 17765912.5, dated Jul. 23, 2019, 6 pages.

Szeliski, "Image Alignment and Stitching: A Tutorial", Technical Report (Carnegie Mellon University), Sep. 27, 2004, 59 pages.

Nosratinia, "Enhancement of JPEG-Compressed Images by Re-application of JPEG", Journal of VLSI Signal Processing Systems for Signal, Image and Video Technology, vol. 27, No. 1-2, Feb. 2001, pp. 1-20.

Search Report received for corresponding United Kingdom Patent Application No. 1604504.9, dated Sep. 20, 2016, 3 pages.

International Search Report and Written Opinion received for corresponding Patent Cooperation Treaty Application No. PCT/FI2017/050085, dated May 11, 2017, 15 pages.

* cited by examiner

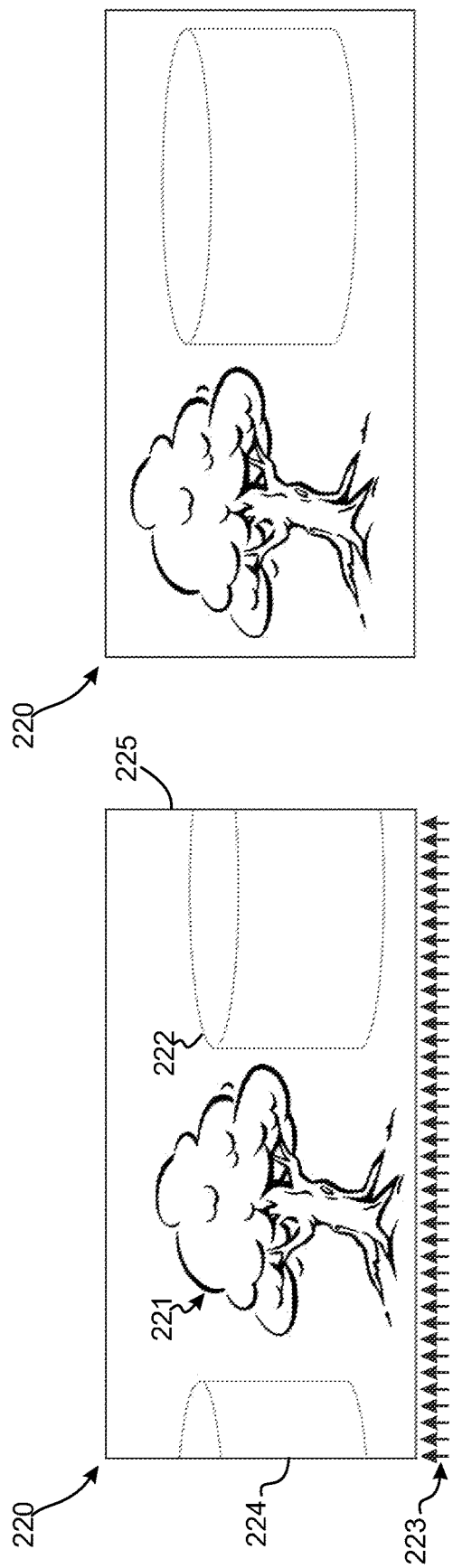
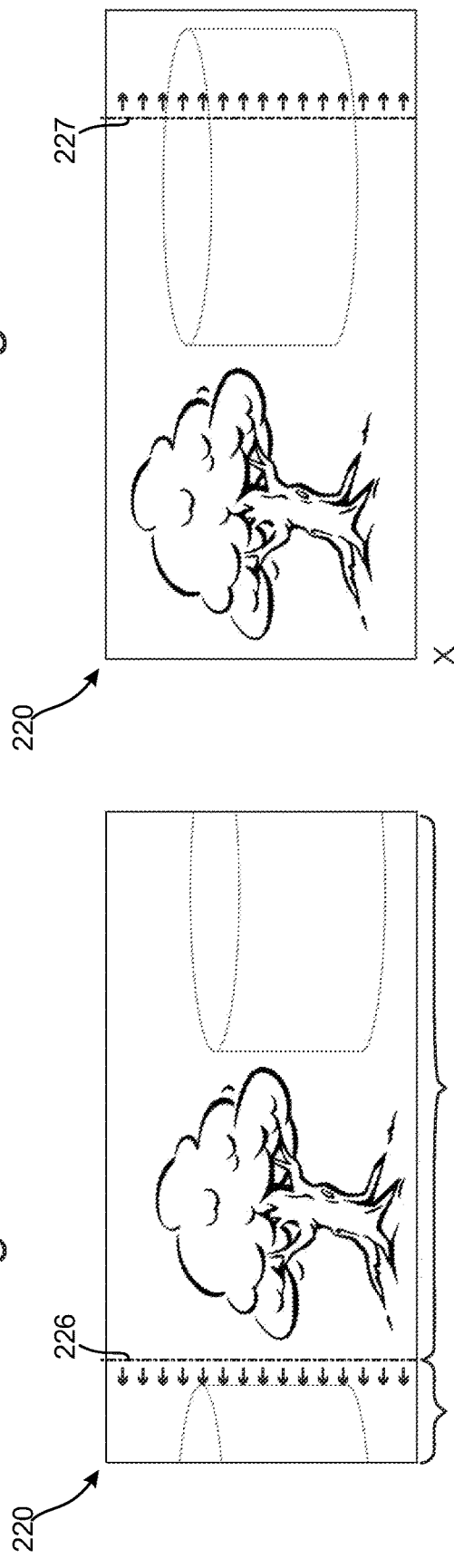

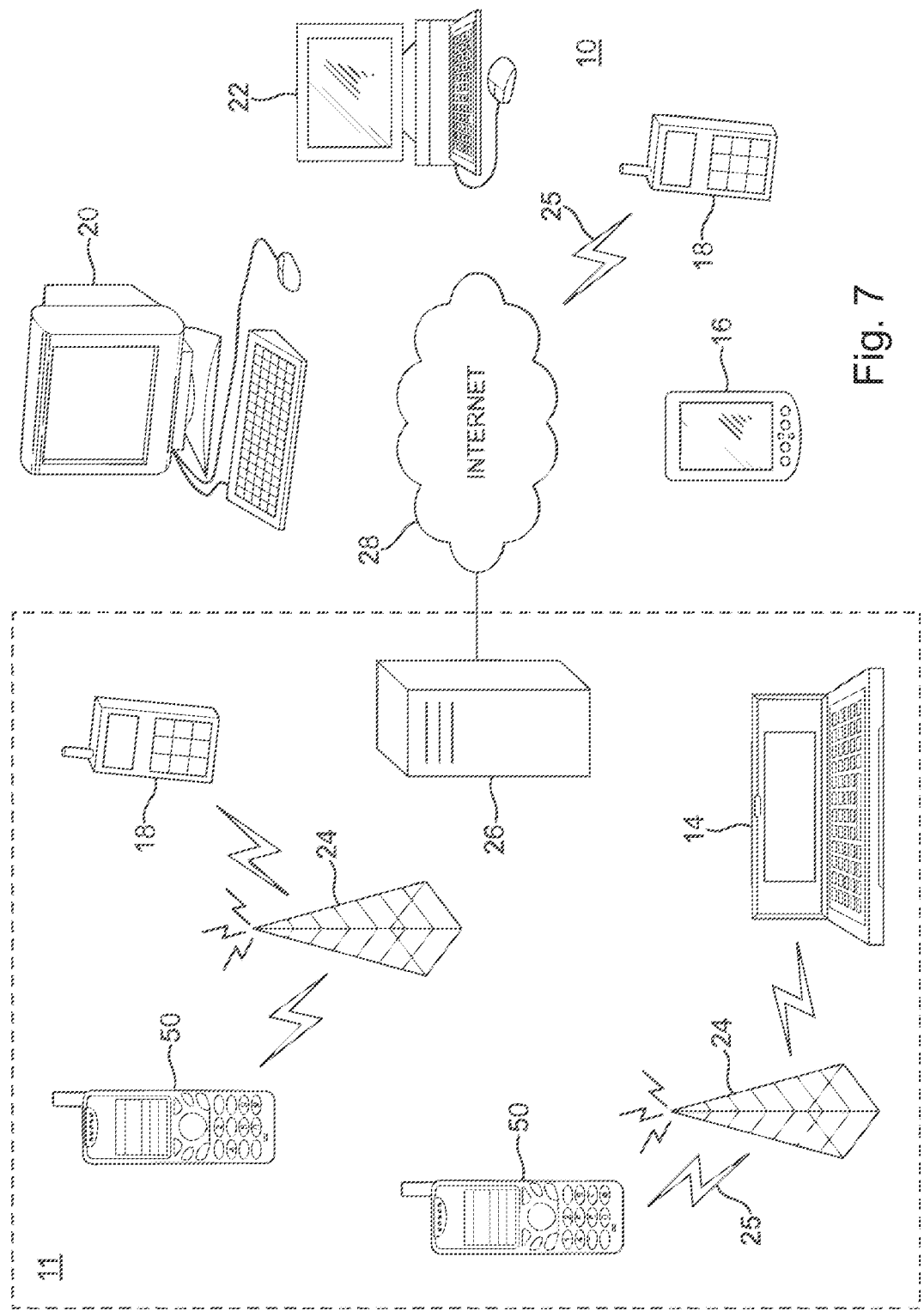

METHOD AND APPARATUS FOR PROCESSING VIDEO INFORMATION

RELATED APPLICATION

This application was originally filed as PCT Application No. PCT/FI2017/050085 filed Feb. 14, 2017 which claims priority benefit from GB Application No. 1604504.9 filed Mar. 17, 2016.

TECHNICAL FIELD

The present invention relates to a method for processing video information, an apparatus for processing video information, and computer program for processing video information.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

360 degree images are images which present a whole surrounding area around the capturing point of the image. Such images have two extreme left and right parts which are continuation of each other. In other words, the scene to the left of the left edge continues from the right edge, and correspondingly, the scene to the right of the right edge continues from the left edge. Such panoramic images are becoming more and more popular as head mounted displays (HMDs) are becoming more useful nowadays.

A head mounted display is a display device, worn on the head that has a small display optic in front of the eyes. One use case for the head mounted display is ability to watch live of pre-recorded videos. Compared to traditional videos, when watching a 360 degree panoramic video with a head mounted display a user may be able to feel much more immersed inside the world of the video. Optional stereo effect in the video may enhance the immersive feeling even further.

In 360° content provided to viewing devices such as head mounted displays, the amount of data which should be transmitted tends to be much larger than conventional 2-dimensional (2D) and even stereoscopic content. Therefore, there is need for better compression of the 360° content. Such more efficient encoding might provide easier potential broadcasting, storage, and/or streaming of such content. Current infrastructure for broadcasting may not be capable of transmitting such huge amount of data and hence, there might be a call for algorithms to encode 360° image content more efficiently.

SUMMARY

Various embodiments provide methods, apparatuses and computer programs for processing video information. In accordance with an embodiment, there is provided a method for processing video information.

Various aspects of examples of the invention are provided in the detailed description.

According to a first aspect, there is provided a method comprising:

receiving an image obtained from an original image, said image having a first edge and a second edge;

receiving information indicative of a location of a division boundary, said division boundary dividing the image into a first part and a second part; and rearranging the image by exchanging the order of the first part and the second part to obtain a reconstructed original image.

According to a second aspect, there is provided an apparatus comprising at least one processor; and at least one memory including computer program code the at least one memory and the computer program code configured to, with the at least one processor, cause the apparatus to perform at least the following:

receive an image obtained from an original image, said image having a first edge and a second edge;

receive information indicative of a location of a division boundary, said division boundary dividing the image into a first part and a second part; and rearrange the image by exchanging the order of the first part and the second part to obtain a reconstructed original image.

According to a third aspect, there is provided an apparatus comprising:

means for receiving an image obtained from an original image, said image having a first edge and a second edge;

means for receiving information indicative of a location of a division boundary, said division boundary dividing the image into a first part and a second part; and means for rearranging the image by exchanging the order of the first part and the second part to obtain a reconstructed original image.

According to a fourth aspect, there is provided a computer readable storage medium stored with code thereon for use by an apparatus, which when executed by a processor, causes the apparatus to perform:

receive an image obtained from an original image, said image having a first edge and a second edge;

receive information indicative of a location of a division boundary, said division boundary dividing the image into a first part and a second part; and rearrange the image by exchanging the order of the first part and the second part to obtain a reconstructed original image.

According to a fifth aspect, there is provided a method comprising:

obtaining an image having a first edge and a second edge;

searching a location suitable for a division boundary for dividing the image into a first part and a second part;

rearranging the image by exchanging the order of the first part and the second part to obtain a reconstructed original image; and providing an indication of a location of the division boundary.

According to a sixth aspect, there is provided an apparatus comprising at least one processor and at least one memory including computer program code the at least one memory and the computer program code configured to, with the at least one processor, cause the apparatus to perform at least the following:

obtain an image having a first edge and a second edge;

search a location suitable for a division boundary for dividing the image into a first part and a second part;

rearrange the image by exchanging the order of the first part and the second part to obtain a reconstructed original image; and provide an indication of a location of the division boundary.

According to a seventh aspect, there is provided an apparatus comprising:

means for obtaining an image having a first edge and a second edge;

means for searching a location suitable for a division boundary for dividing the image into a first part and a second part;

means for rearranging the image by exchanging the order of the first part and the second part to obtain a reconstructed original image; and means for providing an indication of a location of the division boundary.

According to an eight aspect, there is provided a computer readable storage medium stored with code thereon for use by an apparatus, which when executed by a processor, causes the apparatus to perform:

obtain an image having a first edge and a second edge;

search a location suitable for a division boundary for dividing the image into a first part and a second part;

rearrange the image by exchanging the order of the first part and the second part to obtain a reconstructed original image; and provide an indication of a location of the division boundary.

BRIEF DESCRIPTION OF THE DRAWINGS

For a more complete understanding of example embodiments of the present invention, reference is now made to the following descriptions taken in connection with the accompanying drawings in which:

FIG. 2a illustrates an example of an 360° frame, in accordance with an embodiment;

FIG. 2b illustrates an example of a new division location of the 360° frame of FIG. 2a, in accordance with an embodiment;

FIG. 2c illustrates an example of the 360° frame of FIG. 2a after shifting the image at the new division location shown in FIG. 2b, in accordance with an embodiment;

FIG. 2d illustrates an example of the 360° frame of FIG. 2c at a decoding side, where the original edge is illustrated for shifting the reconstructed image back to represent the original image shown in FIG. 2a, in accordance with an embodiment;

FIG. 7 shows an example of an arrangement for wireless communication comprising a plurality of apparatuses, networks and network elements.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1B:
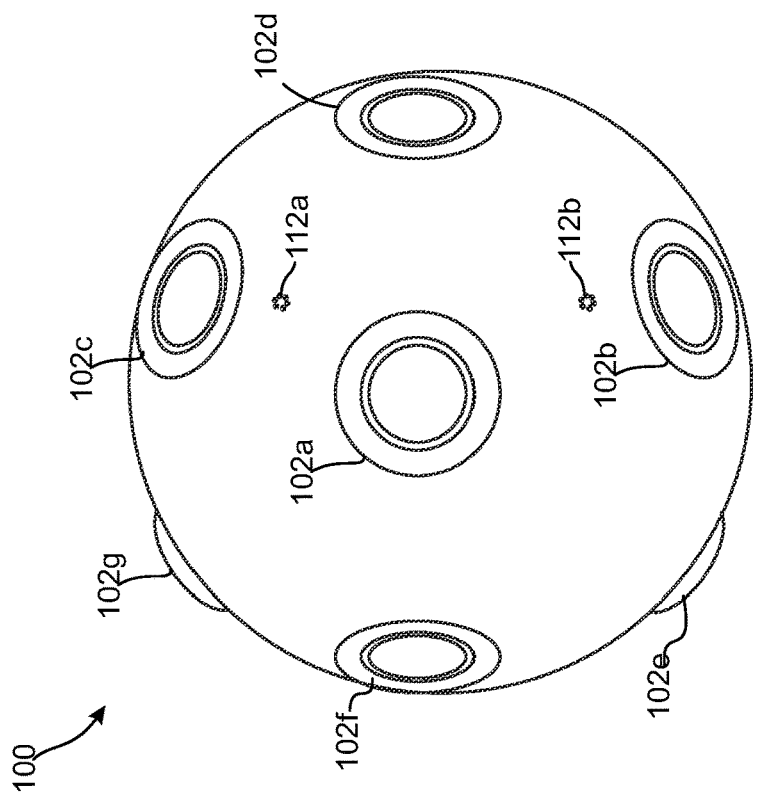
FIG. 1b shows a perspective view of a multi-camera system, in accordance with an embodiment.
Figure 1A:
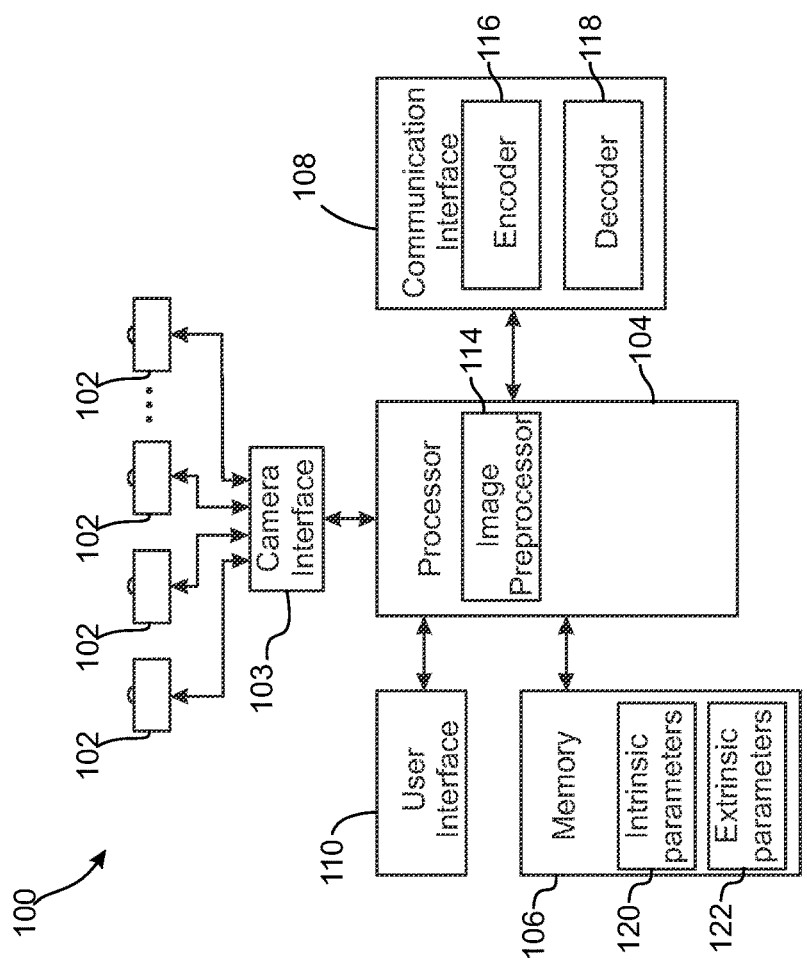
FIG. 1a shows an example of a multi-camera system as a simplified block diagram, in accordance with an embodiment.

FIG. 1a illustrates an example of a multi-camera system 100, which may be able to capture and produce 360 degree stereo panorama video. The multi-camera system 100 comprises two or more camera units 102. In this example the number of camera units 102 is eight, but may also be less than eight or more than eight. Each camera unit 102 is located at a different location in the multi-camera system and may have a different orientation with respect to other camera units 102 so that they may capture a part of the 360 degree scene from different viewpoints substantially simultaneously. A pair of camera units 102 of the multi-camera system 100 may correspond with left and right eye viewpoints at a time. As an example, the camera units 102 may have an omnidirectional constellation so that it has a 360° viewing angle in a 3D-space. In other words, such multi-camera system 100 may be able to see each direction of a scene so that each spot of the scene around the multi-camera system 100 can be viewed by at least one camera unit 102 or a pair of camera units 102.

Without losing generality, any two camera units 102 of the multi-camera system 100 may be regarded as a pair of camera units 102. Hence, a multi-camera system of two cameras has only one pair of camera units, a multi-camera system of three cameras has three pairs of camera units, a multi-camera system of four cameras has six pairs of camera units, etc. Generally, a multi-camera system 100 comprising N camera units 102, where N is an integer greater than one, has N(N−1)/2 pairs of camera units 102. Accordingly, images captured by the camera units 102 at a certain time may be considered as N(N−1)/2 pairs of captured images.

The multi-camera system 100 of FIG. 1a may also comprise a processor 104 for controlling the operations of the multi-camera system 100. The camera units 102 may be connected, for example, via a camera interface 103 to the processor 104. There may also be a memory 106 for storing data and computer code to be executed by the processor 104, and a transceiver 108 for communicating with, for example, a communication network and/or other devices in a wireless and/or wired manner. The transceiver 108 may comprise an encoder 116 and may also comprise a decoder 118. However, the multi-camera system 100 may also be implemented without the decoder 118.

The user device 100 may further comprise a user interface (UI) 110 for displaying information to the user, for generating audible signals and/or for receiving user input. However, the multi-camera system 100 does not need to comprise each feature mentioned above, or may comprise other features as well. For example, there may be electric and/or mechanical elements for adjusting and/or controlling optics of the camera units 102 (not shown).

FIG. 1a also illustrates some operational elements which may be implemented, for example, as a computer code in the software of the processor, in hardware, or both. An image processor 114 may perform image analyses and image shifting when the image processor 114 determines that compression efficiency may be improved if an edge of an image were in a different location, as will be discussed later in this specification.

The multi-camera system 100 may also comprise intrinsic parameters 120 and extrinsic parameters 122 for camera units 102. The parameters may be stored, for example, in the memory 106.

It should be mentioned here that the cameras 102 and the other elements of FIG. 1a may be implemented as separate units. For example, the processor 104, the camera interface 103, the memory 106, the communication interface 108 and the user interface 110 may form an image processing apparatus and the cameras may form an image capturing apparatus. Furthermore, the image processing apparatus may not have the camera interface 103 but may be able to receive image information via another appropriate interface (not shown) and/or from the memory 106, for example. Furthermore, here may also be other operational elements in the multi-camera system 100 than those depicted in FIG. 1a.

FIG. 1b shows as a perspective view an example of an apparatus comprising the multi-camera system 100. In FIG. 1b seven camera units 102a-102g can be seen, but the multi-camera system 100 may comprise even more camera units which are not visible from this perspective. FIG. 1b also shows two microphones 112a, 112b, but the apparatus may also comprise one or more than two microphones.

In accordance with an embodiment, the multi-camera system 100 may be controlled by another device (not shown), wherein the multi-camera system 100 and the other device may communicate with each other and a user may use a user interface of the other device for entering commands, parameters, etc. and the user may be provided information from the multi-camera system 100 via the user interface of the other device.

Some terminology regarding the multi-camera system 100 will now be shortly described. A viewport is a part of the scene which is displayed by a head mounted display at a time. Both left and right eye images may have overlapping, but slightly different viewports. A camera space, or camera coordinates, stands for a coordinate system of an individual camera unit 102 whereas a world space, or world coordinates, stands for a coordinate system of the multi-camera system 100 as a whole. An optical flow may be used to describe how objects, surfaces, and edges in a visual scene move or transform, when an observing point moves between from a location of one camera to a location of another camera. In fact, there does not need to be any actual movement but it may virtually be determined how the view of the scene might change when a viewing point is moved from one camera unit to another camera unit. A parallax can be regarded as a displacement or difference in the apparent position of an object when it is viewed along two different lines of sight. The parallax may be measured by the angle or semi-angle of inclination between those two lines. The parallax may be measured by the angle or semi-angle of inclination between those two lines. Parallax motion effect can be regarded as an apparent motion which objects may seem to take when an observer moves, or the observer rotates her/his head.

The user device 100 may further comprise one or more sensors to estimate the depth of the scene. Such sensors may be aligned with the cameras. In such scenario, each depth sensor will be synced with the aligned camera to achieve a respective depth estimation for each captured view of the scene. The content provided by such depth sensors may be used in depth image based rendering (DIBR) algorithms to render any required virtual views from the viewpoints not directly covered by the cameras.

A depth map may be used to describe the location of objects in a depth direction of the scene. Such a depth map may then be used to determine how the view of the scene might change when a viewing point is moved from one camera unit to another camera unit. Furthermore, as was already mentioned, optical flow and/or depth map data are not the only possibilities to provide optical enhancement data for producing parallax motion effect.

Figure 1C:
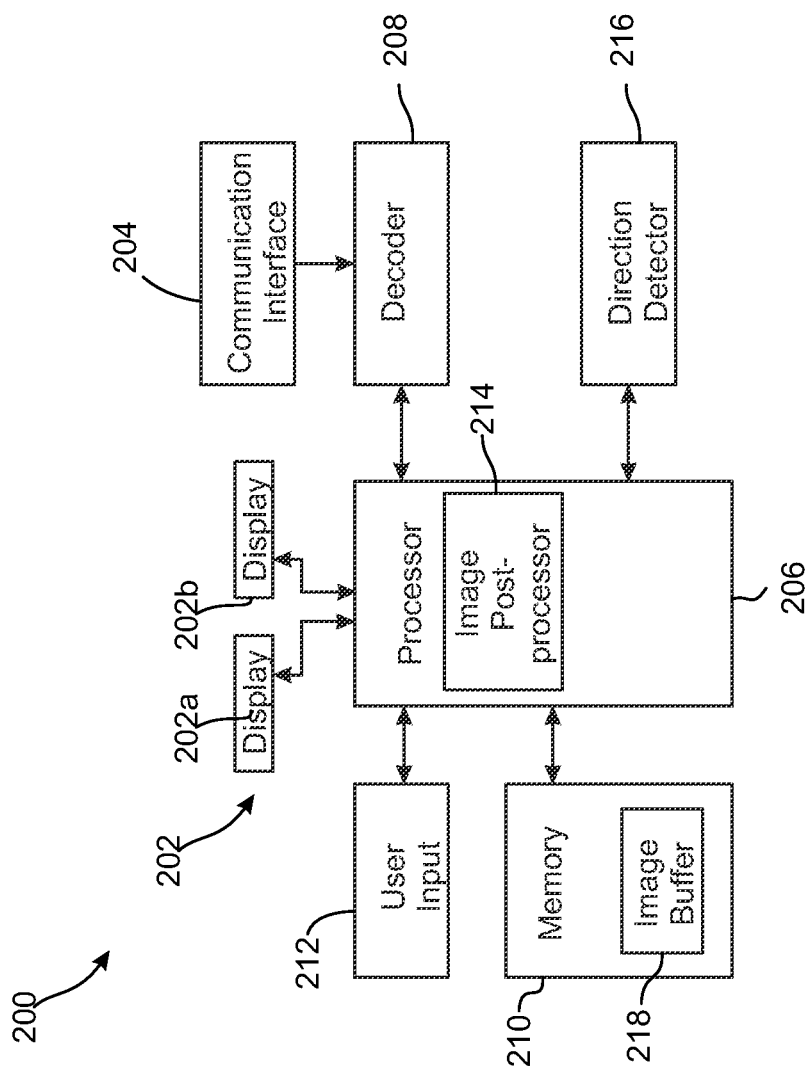
FIG. 1c shows an example of a video playback apparatus as a simplified block diagram, in accordance with an embodiment.

FIG. 1c illustrates an example of a video playback apparatus 200, such as a head mounted display. The video playback apparatus 200 may comprise, for example, one or two displays 202 for video playback. When two displays are used a first display 202a may display images for a left eye and a second display 202b may display images for a right eye, in accordance with an embodiment. In case of only one display 202, that display 202 may be used to display images for the left eye on the left side of the display 202 and to display images for the right eye on the right side of the display 202. The video playback apparatus 200 may be provided with encoded data streams via a communication interface 204 and a processor 206 may perform control operations for the video playback apparatus 200 and may also perform operations to reconstruct video streams for displaying on the basis of received encoded data streams. The video playback apparatus 200 may further comprise a processor 206 for reconstructing video streams for displaying on the basis of received encoded data streams. There may also be a decoding element 208 for decoding received data streams and a memory 210 for storing data and computer code, and an input element 212 for receiving e.g. user instructions. The video playback apparatus 200 may further comprise a direction detector 216 to detect the direction where the video playback apparatus 200 is pointed at. This direction may then be used to determine the part of a scene the user of the video playback apparatus 200 is looking at. The direction detector 216 may comprise, for example, an electronic compass, a gyroscope and/or an accelerometer.

The video playback device 200 may comprise an image post-processor 214 which may perform image shifting on the basis of optical enhancement information received e.g. from an encoding device, from a file or from another source, as will be described later in this specification.

It should be noted that the video playback device 200 does not need to comprise each of the above elements or may also comprise other elements. For example, the decoding element 208 may be a separate device wherein that device may perform decoding operations and provide decoded data stream to the video playback device 200 for further processing and displaying decoded video streams.

As was mentioned above, 360° images are images which present a whole surrounding area around the capturing point of the image, wherein a 360° image may be divided at its extreme left and right boundaries due to the direction by which the content has been captured. In this specification, an image may also be called as a frame, which is an electronically coded image comprising picture elements such as pixels. FIG. 2a illustrates an example of a 360° frame 220. In the example of FIG. 2a a scene captured to the frame 220 comprises a tree 221 and a barrel 222. The left edge of the frame is on the barrel 222 so that a part of the barrel 222 is visible at the left edge 224 of the frame and the other part of the barrel 222 is visible at the right edge 225 of the frame 220. Hence, there are edges of the object at both the left edge 224 and the right edge 225. The presence of such edges of objects at frame edges 224, 225 may increase the amount of information needed for encoding the frame compared to a situation where the edges 224, 225 of the frame contain smoother areas.

When a 360° frame is captured, depending on the direction of the camera(s) by which the content has been captured, the left and right boundaries of the image are put in a specific location. This location may solely depend on the camera locations rather than considering the content itself. If the boundaries of the 360° image is dividing an object, a highly textured area or several contours and boarders then the compression efficiency might be sub-optimal at those boundaries. However, if the boundary includes a homogeneous area then the coding might be more efficient at the boundaries as there is not much spatial/temporal dependency on such area and based on the nature of the content. Therefore, the compression efficiency of 360° image may be increased by processing the image in order to make the boundaries more encoder friendly.

In accordance with an embodiment, the image preprocessor 114 may receive an image for analyzing and preprocessing before the image is provided to the encoder 116 for encoding. The image preprocessor 114 may examine whether the current image may be applicable for shifting. If the examination reveals that the current image may be applicable for horizontal shifting, the content of the image may be analyzed to determine whether shifting the image horizontally might improve compression efficiency. On the other hand, if the examination reveals that the current image may not be applicable for horizontal shifting, the image may be provided to the encoder 116 as such. In one embodiment the processor 104 may have a separate selector which examines whether the current image may be applicable for horizontal shifting, wherein the processor 104 may provide to the image preprocessor 114 only such images which may be applicable for horizontal shifting and may provide other images directly to the encoder 116.

The image preprocessor 114 may also decide to apply shifting only on some of the input video while other input video coming from the camera interface 103 are sent to the encoder as such. For example, video signals from some cameras of the multi-camera system 100 may be provided to the image preprocessor 114 which may perform the shifting operations when it determines that it may improve the coding efficiency, while video signals from other cameras of the multi-camera system 100 may be encoded without preprocessing by the image preprocessor 114.

In accordance with an embodiment, an image may be applicable for horizontal shifting if the image does not have temporal dependency to the previous or later content (previous/later images). Hence, it may be possible to use horizontal shifting without having penalty of application of a shifting algorithm on temporal predictions. For example, instantaneous decoding refresh (IDR) image locations where there is no dependency between the previous frames and future frames may be such images.

In the following, the term shifting means horizontal shifting unless otherwise expressed.

Figure 2G:
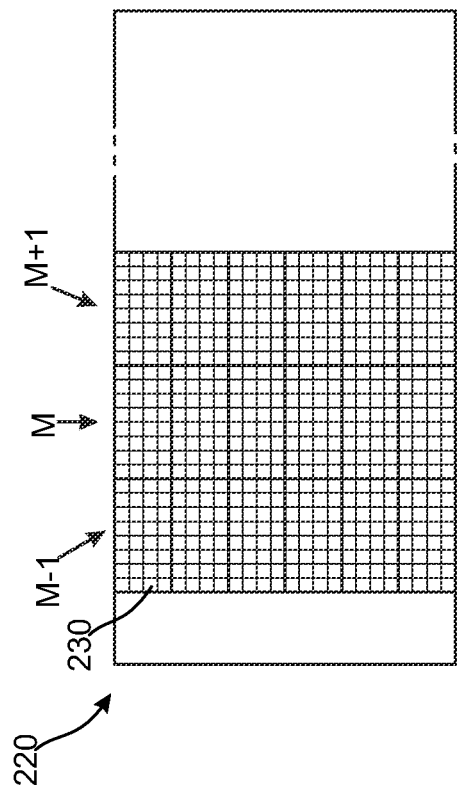
FIG. 2g illustrates an example of block-wise image processing, in accordance with an embodiment.
Figure 2E:
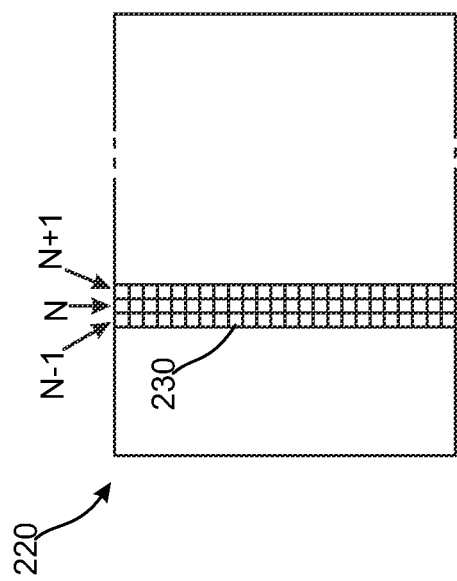
FIG. 2e illustrates an example of columns of pixels that may be used in image processing, in accordance with an embodiment.
Figure 3:
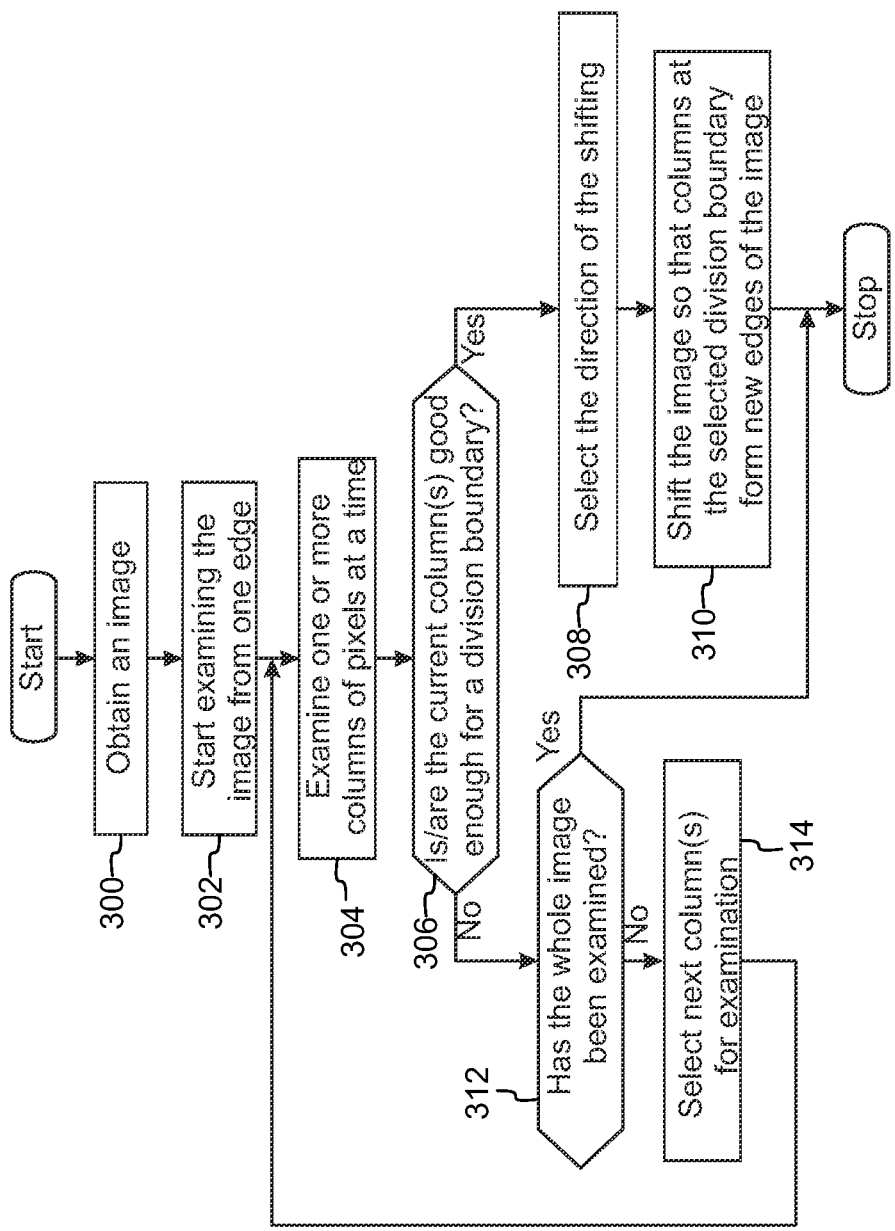
FIG. 3 shows a flowchart of a method of image shifting at an encoder, in accordance with an embodiment.

In accordance with an embodiment, the image preprocessor 114 may search possible shifting location(s) as follows, with reference to the flow diagram of FIG. 3 and the image of FIGS. 2a-2c. The image preprocessor 114 obtains an image (block 300) and examines the content of the image 220 alongside its width to find out whether the image has contents which may be appropriate for forming a new edge. The image preprocessor 114 may, for example, start the examination (block 302 in FIG. 3) from one edge (e.g. the left edge) and proceed towards the other edge (e.g. the right edge). The image preprocessor 114 may use 304 one or more adjacent columns of pixels at a time to find out whether that column or columns does not have edges of objects or otherwise has smooth content. As an example, the image preprocessor 114 may examine three, five, nine or seventeen adjacent columns of pixels at a time In FIG. 2a the vertical arrows 223 illustrate some examples of columns of pixels which may be examined. For example, when examining a column N as is illustrated in FIG. 2e, an equal number of adjacent columns on both sides of the column under examination may be used in the determination. Hence, in case of three-column examination columns N−1, N and N+1 could be used, in case of five-column examination columns N−2, N−1, N, N+1 and N+2 could be used, etc.

Figure 2F:
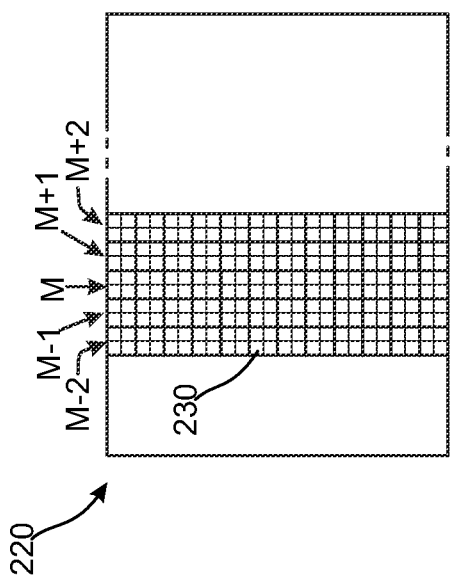
FIG. 2f illustrates an example of block-wise image processing, in accordance with an embodiment.

The examination may also be performed in a block-wise manner, i.e. using blocks of 2×2, 2×4, 4×4, 4×8, 4×16, 8×8, 8×16 or 16×16 pixels in a vertical direction. FIG. 2f illustrates an example where 2×2 blocks are used, wherein the current column of blocks M and two, four, six or more adjacent columns of blocks M−1, M+1; M−2, M+2 on both sides of the current column M may be used in the examination. FIG. 2g illustrate an example where 4×8 blocks are used, respectively. Squares 230 in FIGS. 2e-2g illustrate pixels.

The analysis may be done by e.g. calculating the amount of edges, contours, borders and/or objects in any potential vertical column (vertical line) having width of one or more pixels. This is to try to find the best candidate to locate a new boundary (edge) having fewer amounts of dependency between left and right side of the said vertical line compared to the original boundary or until a good enough candidate has been found (block 306). Such potential location might guarantee that the extreme left and right edges will be encoded properly without sacrificing any coding efficiency according to the spatial/temporal dependencies in the same frame/next frames, respectively. The determination whether an examined location proves to be a good enough candidate may be based on the amount of improvement of compression efficiency provided by the new boundary.

The examination may also depend on the consecutive frames and their content/dependency with the current frame. For example, the shifting location may be good enough for the current frame while considering the next frames, another location may prove to be the optimum shifting location. Therefore, the image preprocessor 114 may choose the available current and next frames to decide about the shifting location. The number of next frames to be considered may depend on a group of pictures (GOP) size used in the encoder or the number of frames between the current frame and the next IDR frame.

The examination may be stopped, for example, when a proper shifting location has been found 310, or when the whole width of the image has been examined 312. FIG. 2b illustrates an example where the column 226 at the location X has been determined suitable for a shifting location.

If the current column(s) is/are not evaluated to be good enough and there still are unexamined columns, a next set of columns may be selected 314 and the process may be repeated from block 304.

In accordance with an embodiment, a coding efficiency may be determined when the potential location have been found. The coding efficiency determination may comprise estimating whether compression would be improved if the image were rearranged by locating the boundary to the potential location. The coding efficiency determination may be performed for several different potential locations and that location which provides the best compression improvement might be selected as the division boundary. In accordance with another embodiment, the coding efficiency determination may be performed for several different potential locations until compression improvement exceeds a threshold.

When the suitable shifting location has been found, the image preprocessor 114 may also select 308 the direction of the shifting. This may be based on, for example, the distance of the shifting location from the vertical edges of the image. In accordance with an embodiment, if the shifting location X is closer to the left edge, the image may be shifted to the left, and, correspondingly, if the shifting location X is closer to the right edge, the image may be shifted to the right. In the example of FIG. 2b the shifting location X is closer to the left edge. Hence, the image may be shifted to the left. In this case, it is assumed that the width of image is divided to two parts (X and Width−X).

Shifting of the image may be performed as follows, in accordance with an embodiment. The whole image may be shifted horizontally in order to create a new 360° image where the boundary does have fewer amounts of contours, borders and/or edges. The columns of pixels which are on the left side of the shifting location are moved to the right side of the image. This may be appropriate when the shifting direction is to the left. On the other hand, when the shifting direction is to the right, columns of pixels which are on the right side of the shifting location may be moved to the left side of the image. Thus, the shifted version of the original image may be considered to be an image in which the left and right side of the original frame have been stitched together and the shifting location forms the left and right edge of the shifted image. FIG. 2c illustrates a shifted version of the image of FIGS. 2a and 2b. According to this example, the left edge of the shifted image corresponds with the location X of the original image.

It should be noted here that the above mentioned shifting of image/pixels does not necessarily mean that the pixel values are actually moved from one memory location to another memory location but only information on the edges of the image may be adjusted to correspond with the shifted location of the edges. Alternatively, the reference to the image pixels can be changed to refer to the same memory content differently to address the rearranged shifted image.

When a new shifting location has been found, an indication of such location may also be inserted into a bitstream to inform a decoder that the encoded image is a shifted version of the original image and in order to enable the decoder to shift back the 360° image to its original presentation. In one embodiment, indication of the shifting location (e.g. the value of X) and an indication of the shifting direction may be inserted into the bitstream and these indications may be sent to the decoder. In accordance with an embodiment, information of only the shifting location but not of the shifting direction is included in a bitstream. In this case, the shifting direction may be determined by the decoder on the basis of distance of the shifting location of an edge of the image. For example, if the shifting location is nearer the left edge of the original image the decoder may determine that the shifting direction is to the left. Correspondingly, if the shifting location is nearer the right edge of the original image the decoder may determine that the shifting direction is to the right. In other words, the decoder can decide which direction is more appropriate for the shifting based on the closeness of the value X to the left or the right border.

Another algorithm that may be used to inform decoder about the shifting location is to include one flag bit to show whether the following value is from the left side of the image or from the right side of the image (e.g. 0 for distances calculated from the left side of the image and 1 for distances calculated from the right side of the image). This flag bit is calculated based on the shifting location places in the left half of the image or in the right half of the image. Following this flag bit, the distance of the shifting location from the side of the image is reported. First, this enables the decoder to substantially immediately find the shifting direction (e.g. bit flag equal 0 means shifting to the left and bit flag equal to 1 means shifting to the right following the aforementioned example on bit flag values). Second, this also enables the encoder to send less amount of bits to locate the shifting location as the distance to be indicated is divided to half compared to when all the shifting location distances along the width of the image were to be indicated.

In accordance with an embodiment, the shifting direction may always be the same irrespective of the shifting location. For example, the image preprocessor 114 may always shift the image to the left or to the right after determining the shifting location. Hence, no information on the shifting direction need be transmitted and the decoder does not need to determine the shifting direction but it may always use the same shifting direction.

In accordance with an embodiment, an indication whether an image has been shifted or not may be inserted into a bitstream for each image. In accordance with another embodiment, the indication may be inserted only for such images for which the shifting operation may be performed. As an example, if the shifting operation is only applicable to intra predicted images, the indication need not be attached with images which have been determined not applicable for shifting.

It should be noted here that the above mentioned indication need not be encoded and inserted into the same bitstream than the image information but it may also be transmitted by some other means or by some other bitstream, such as in a picture parameter set.

When codecs exploit the temporal dependency between frames, application of the above described shifting operation at the beginning of a set of frames may increase the probability that inter prediction between frames would perform optimally.

Searching candidates for the shifting location need not be performed from one edge to another edge, but may also be implemented e.g. so that first a first vertical line from a first edge of the image is examined, then a first vertical line from a right edge of the image is examined, then a second vertical line from the first edge of the image is examined after which a second vertical line from the second edge is examined, etc. until the whole image has been examined or a suitable shifting location has been found.

Figure 4:
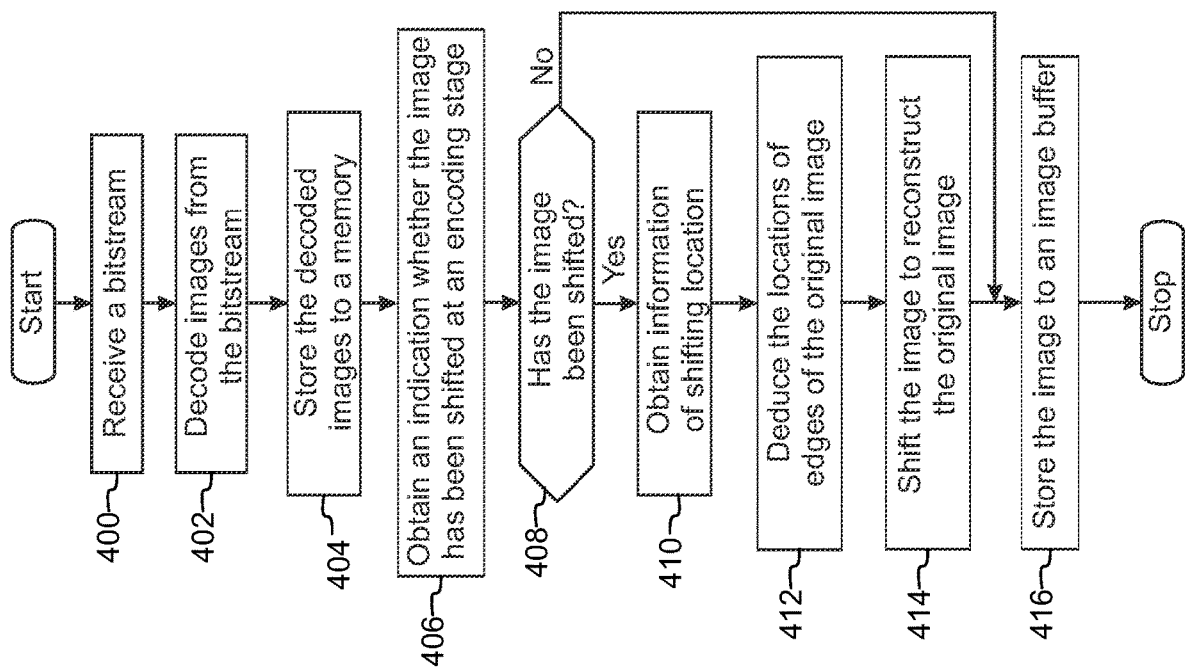
FIG. 4 shows a flowchart of a method of image shifting at a decoder, in accordance with an embodiment.

In the following, operation of a decoder will be described in more detail with reference to the flow diagram of FIG. 4 and the block diagram of video playback apparatus 200 of FIG. 1c, in accordance with an embodiment. The video playback apparatus 200 may receive 400 a bitstream comprising encoded images. A decoder 208 may perform decoding 402 the images to reconstruct the encoded images and store 404 the decoded, reconstructed images to a memory 210. If the bitstream comprises images which an encoder has shifted for improved compression efficiency, the decoder 208 may decode an indication of such images and provide 406 the indication to an image post-processor 214 if the image or images have been shifted at encoding stage.

When the image post-processor 214 detects 408 that a decoded image is a shifted version of an original image, the decoder 208 may also have decoded information on the shifting location 410 (the location of the division boundary 226). Hence, the decoder 208 may also provide that information to the image post-processor 214.

In accordance with an embodiment, information of the shifting direction may be deduced by the image post-processor 214 without receiving information on the shifting direction. For example, the image post-processor 214 may examine the shifting location and deduce whether the left edge or the right edge of the image is nearer the shifting location and shift the decoded image to the opposite direction, i.e. towards the edge which is farther the shifting location. This is illustrated in FIG. 2d. In the example of FIG. 2d, the left edge which is marked with X, corresponds with the location X of the original image. Information indicative of the value of X has been received by the image post-processor 214. The image post-processor 214 may also receive information on the width of the image from the decoder 208 or from some other element of the video playback apparatus 200, or information on the width of the image may have been stored as a parameter of the video playback apparatus 200. Then the actual location of the left edge of the original image (marked with the reference numeral 227 in FIG. 2d) may be deduced 412 by subtracting the value of X from the width of the image. In this example the value of X is smaller than half of the width of the image, wherein the image post-processor 214 may deduce that the shifting location has been nearer the left edge in the original image and therefore the image post-processor 214 may shift 414 the decoded image to the right and store 416 the shifted version to a reconstructed image buffer 218, for example.

In accordance with another embodiment, information of the shifting direction may be deduced by the image post-processor 214 as follows. The image post-processor 214 may receive, in addition to a value of a shifting location, a flag bit indicative of whether the value of the shifting location is set determined from the left side of the image or from the right side of the image (e.g. 0 for distances calculated from the left side of the image and 1 for distances calculated from the right side of the image). If the received flag bit indicates that the shifting location has been calculated from the left side of the image, the image post-processor 214 may determine that the left edge of the original image is at the distance indicated by the shifting location from the right edge of the received image. Correspondingly, if the received flag bit indicates that the shifting location has been calculated from the right side of the image, the image post-processor 214 may determine that the right edge of the original image is at the distance indicated by the shifting location from the left edge of the received image. The image post-processor 214 may then shift the received image to obtain a reconstructed original image and store 416 the shifted version to a reconstructed image buffer 218, for example.

In the following, another example of deducing the shifting location will be shortly described. In this example depth maps may be utilized in the determination. The preprocessor 114 may examine depth information related to the image. If such a boundary line (a vertical line in the image) has been found for which the depth map indicates substantially similar depth along the boundary line, such location may be selected for the shifting location. Alternatively, if the depth of the scene changes a lot along the boundary line, this may be an indicator that this boundary is not a suitable one to be selected for the shifting location. In accordance with another example, the boundary line may be selected on a location which has the farthest location from the camera. In this case, the potential artifacts on those areas (around the boundary) may be less subjectively visible to the users. This method may be combined with any other method and be used to find the shifting location.

In the following, some non-limiting examples of the selection of the shifting location X will be shortly described. As a first example, amount of high frequency components (HFCs) around any potential vertical line along the width of the image may be examined. This may mean that the more high frequency components the less likely it is that this location would be selected as the potential candidate. As another example, an amount of inconsistency in the texture image (homogeneous areas) and/or an amount of contours available may be used in the determination. The less amount of contours/edges may indicate that it is more likely that this location would be selected as the potential candidate. This may be attributed to the fact that it may be easier to encode such contours/edges when they are a smooth continuation of each other without any discontinuity e.g. boundaries of the image. To locate such contours/edges it may be possible to use any edge finding algorithm e.g. a Sobel filter $$H_{Sobel} = \begin{bmatrix} -1 & 0 & 1 \\ -2 & 0 & 2 \\ -1 & 0 & 1 \end{bmatrix}$$

The Sobel filter may be used to emphasize edges in images. For example, the above described Sobel filter may be convolved with pixels of the image to find out vertical edges in the image. The convolution computes gradients at different locations in the image wherein gradient values may be used to determine whether a vertical edge exist at a certain location or not.

It may also be possible to use size and/or direction of motion vectors for coding the area. In this case, the size and direction of motion vectors for coding the surrounding area of each potential location X may be considered. The one which has the least amount of such dependencies would be more likely to be chosen as the candidate location for shifting.

This selection may be done via a pixel or macroblock based approach. The granularity of such selection may depend on the codec which is used and in general the amount of accuracy required. The smaller the size of the considered block (even block of 1×1 which is a pixel) the more accuracy may be achieved. However, there may be an increase in complexity when the macroblock gets smaller.

Images for which the above described shifting operations may be processed may be frames of a video signal, snap shot images, or other sources of image information. Images may also belong to multi-view image streams such as stereo panorama video. Hence, similar operations may be performed for each of the multi-view image streams. However, when detecting candidate locations for the shifting information of one image stream may be utilized to determine shifting locations for other image streams of the multi-view image stream. This kind of situation may occur, for example, with stereo panorama video in which left and right view are captured from almost the same location, wherein the contents of left and right images may be almost the same. Similarly, the shifting location found for one image in a Multiview video may be used to predict the location of shifting location for other views. This may be done by exploiting the disparity between the views and moving the shifting location considering the amount and direction of the present disparity between the views.

The shifting for consecutive frames can be addressed relatively to the current frame shifting location. This means, if the shifting location between the current frame and the next frame where a shifting is to be applied differs slightly, only such difference is transmitted and there is no need to signal the shifting from the boundaries. This is useful for content where the movement is limited and hence, the shifting locations remain close to each other in the consecutive frames.

Furthermore, the image need not be a horizontal panorama image but it may also be an image which has been obtained by rotating a camera vertically and/or using multiple cameras capable of forming an image which is a representation of a scene surrounding the camera in a vertical direction. Hence, compression efficiency may be improved by searching smooth areas in horizontal direction and shifting the image vertically. Thus, a bottom edge of the image may correspond with the left edge and an upper edge may correspond with the right edge, or vice versa.

Figure 6:
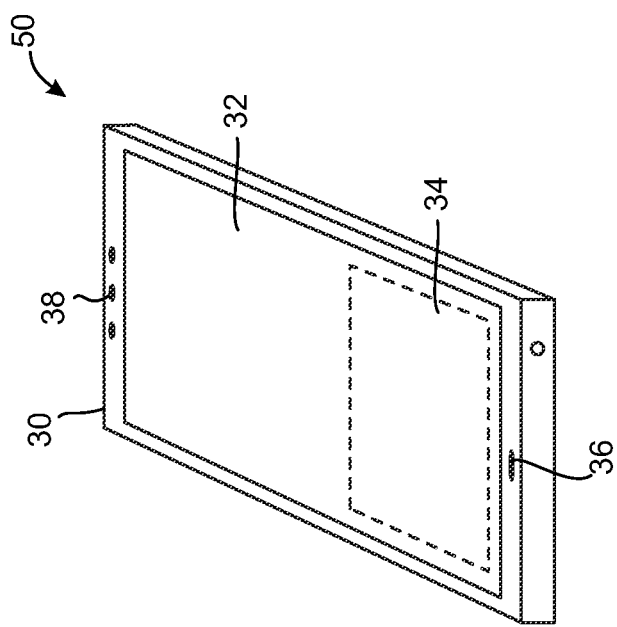
FIG. 6 shows an apparatus according to an example embodiment.
Figure 5:
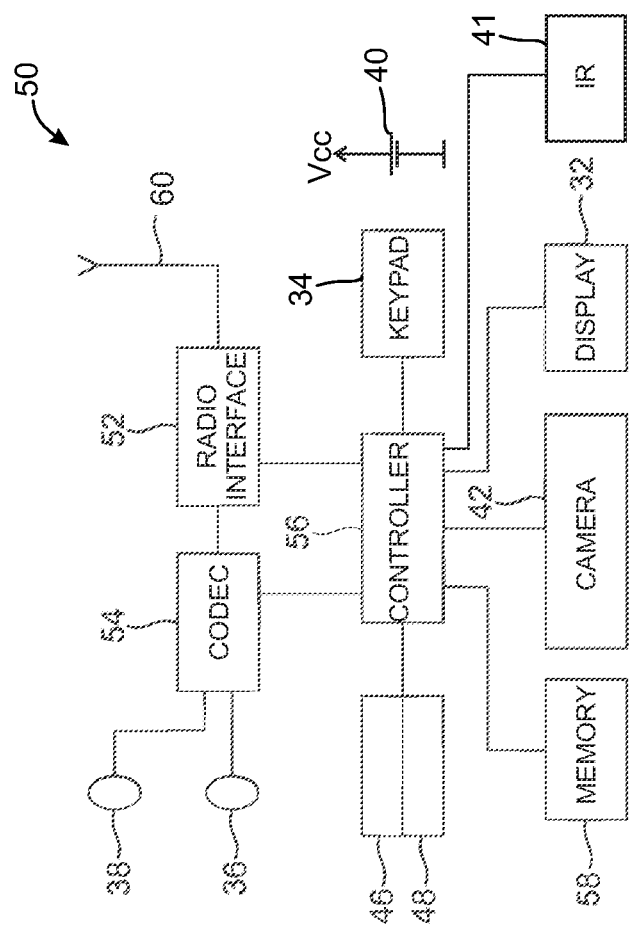
FIG. 5 shows a schematic block diagram of an exemplary apparatus or electronic device, in accordance with an embodiment.

The following describes in further detail suitable apparatus and possible mechanisms for implementing the embodiments of the invention. In this regard reference is first made to FIG. 5 which shows a schematic block diagram of an exemplary apparatus or electronic device 50 depicted in FIG. 6, which may incorporate a transmitter according to an embodiment of the invention.

The electronic device 50 may for example be a mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/FireWire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and a universal integrated circuit card for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 60 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

With respect to FIG. 7, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a global systems for mobile communications (GSM), universal mobile telecommunications system (UMTS), long term evolution (LTE) based network, code division multiple access (CDMA) network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 7 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example, there is provided a method comprising:

receiving an image obtained from an original image, said image having a first edge and a second edge;

receiving information indicative of a location of a division boundary, said division boundary dividing the image into a first part and a second part; and rearranging the image by exchanging the order of the first part and the second part to obtain a reconstructed original image.

In some embodiments of the method said information indicative of a location of a division boundary indicates a distance between the division boundary and a first edge of the original image, wherein the method comprises:

determining that the distance of the division boundary from the second edge of the image is the same than the distance of the division boundary from the first edge of the original image.

In some embodiments the method comprises:

deducing that a distance between the division boundary and the first edge is smaller than a distance between the division boundary and the second edge; rearranging the image by shifting the second part towards the first edge; and stitching the first part to the other side of the second edge; or deducing that a distance between the division boundary and the second edge is smaller than a distance between the division boundary and the first edge; rearranging the image by shifting the first part towards the second edge; and stitching the second part to the other side of the first edge.

In some embodiments of the method the second edge is parallel to the first edge.

In some embodiments of the method:

the division boundary is a vertical boundary comprising one or more columns of pixels;

the first edge is a left edge of the image; and the second edge is a right edge of the image.

In some embodiments the method comprises:

receiving an indication whether the image has been shifted; and rearranging the image if the indication reveals that the image is a shifted representation of the original image.

In some embodiments the method comprises:

receiving a flag indicative of whether said information of the location of the division boundary indicates a distance between the division boundary and the first edge or the second edge of the original image.

In some embodiments the method comprises:

receiving a flag indicative of whether said information of the location of the current division boundary indicates a distance between the current division boundary and a previous division boundary or the edge of the original image.

In some embodiments the method comprises:

storing pixels of the received image to a memory;

providing references to image pixels of the shifted representation of the original image in the memory; and rearranging the image by changing the references to address the rearranged shifted image.

In some embodiments of the method the original image is a 360 degrees panorama image.

According to a second example, there is provided an apparatus comprising at least one processor; and at least one memory including computer program code the at least one memory and the computer program code configured to, with the at least one processor, cause the apparatus to perform at least the following:

receive an image obtained from an original image, said image having a first edge and a second edge;

receive information indicative of a location of a division boundary, said division boundary dividing the image into a first part and a second part; and rearrange the image by exchanging the order of the first part and the second part to obtain a reconstructed original image.

In some embodiments the apparatus comprises computer program code configured to, with the at least one processor, cause the apparatus to:

determine that the distance of the division boundary from the second edge of the image is the same than the distance of the division boundary from the first edge of the original image.

In some embodiments the apparatus comprises computer program code configured to, with the at least one processor, cause the apparatus to:

deduce that a distance between the division boundary and the first edge is smaller than a distance between the division boundary and the second edge; rearranging the image by shifting the second part towards the first edge; and stitching the first part to the other side of the second edge; or deduce that a distance between the division boundary and the second edge is smaller than a distance between the division boundary and the first edge; rearranging the image by shifting the first part towards the second edge; and stitching the second part to the other side of the first edge.

In some embodiments the apparatus comprises computer program code configured to, with the at least one processor, cause the apparatus to:

receive an indication whether the image has been shifted; and rearrange the image if the indication reveals that the image is a shifted representation of the original image.

In some embodiments the apparatus comprises computer program code configured to, with the at least one processor, cause the apparatus to:

receive a flag indicative of whether said information of the location of the division boundary indicates a distance between the division boundary and the first edge or the second edge of the original image.

In some embodiments the apparatus comprises computer program code configured to, with the at least one processor, cause the apparatus to:

receive a flag indicative of whether said information of the location of the current division boundary indicates a distance between the current division boundary and a previous division boundary or the edge of the original image.

In some embodiments the apparatus comprises computer program code configured to, with the at least one processor, cause the apparatus to:

store pixels of the received image to a memory;

provide references to image pixels of the shifted representation of the original image in the memory; and rearrange the image by changing the references to address the rearranged shifted image.

According to a third example, there is provided an apparatus comprising:

means for receiving an image obtained from an original image, said image having a first edge and a second edge;

means for receiving information indicative of a location of a division boundary, said division boundary dividing the image into a first part and a second part; and means for rearranging the image by exchanging the order of the first part and the second part to obtain a reconstructed original image.

According to a fourth example, there is provided a computer readable storage medium stored with code thereon for use by an apparatus, which when executed by a processor, causes the apparatus to:

receive an image obtained from an original image, said image having a first edge and a second edge;

receive information indicative of a location of a division boundary, said division boundary dividing the image into a first part and a second part; and rearrange the image by exchanging the order of the first part and the second part to obtain a reconstructed original image.

According to a fifth example, there is provided a method comprising:

obtaining an image having a first edge and a second edge;

searching a location suitable for a division boundary for dividing the image into a first part and a second part;

rearranging the image by exchanging the order of the first part and the second part to obtain a reconstructed original image; and providing an indication of a location of the division boundary.

In some embodiments of the method searching a location suitable for a division boundary comprises:

examining an area of the image to determine smoothness of the content of the area;

determining that the smoothness of the content of the area provides better coding efficiency if the division boundary is located at the area; and using the location of the area as the division boundary.

In some embodiments of the method the examined area is a vertical column of the image.

In some embodiments the method comprises:

examining a depth map of the image to search an area having similar depth along the vertical column.

In some embodiments the method comprises:

examining columns of the image from the first edge to the second edge; and selecting the column which induces the best coding efficiency as the division boundary.

In some embodiments the method comprises:

examining columns of the image starting from the first edge towards the second edge until a column fulfilling an efficiency criteria has been found; and selecting the column which fulfils the efficiency criteria as the division boundary.

In some embodiments the method comprises:

examining an area of the image to determine a number of contours in the area; and using the location of the area as the division boundary, if the number of contours is less than a threshold.

In some embodiments the method comprises:

examining areas of the image to determine a number of contours in the area; and using the location of that area as the division boundary which has the smallest number of contours.

In some embodiments the method comprises:

providing a flag indicative of whether the image has been shifted.

In some embodiments the method comprises:

providing a flag indicative of whether said information of the location of the division boundary indicates a distance between the division boundary and the first edge or the second edge of the original image.

In some embodiments the method comprises:
providing a flag indicative of whether said information of the location of the current division boundary indicates a distance between the current division boundary and a previous division boundary or the edge of the original image.

According to a sixth example, there is provided an apparatus comprising at least one processor and at least one memory including computer program code the at least one memory and the computer program code configured to, with the at least one processor, cause the apparatus to perform at least the following:
obtain an image having a first edge and a second edge;
search a location suitable for a division boundary for dividing the image into a first part and a second part;
rearrange the image by exchanging the order of the first part and the second part to obtain a reconstructed original image; and
provide an indication of a location of the division boundary.

In some embodiments the apparatus comprises computer program code configured to, with the at least one processor, cause the apparatus to search a location suitable for a division boundary by:
examining an area of the image to determine smoothness of the content of the area;
determining that the smoothness of the content of the area provides better coding efficiency if the division boundary is located at the area; and
using the location of the area as the division boundary.

In some embodiments the apparatus comprises computer program code configured to, with the at least one processor, cause the apparatus to:
examine a depth map of the image to search an area having similar depth along the vertical column.

In some embodiments the apparatus comprises computer program code configured to, with the at least one processor, cause the apparatus to:
examine columns of the image from the first edge to the second edge; and
select the column which induces the best coding efficiency as the division boundary.

In some embodiments the apparatus comprises computer program code configured to, with the at least one processor, cause the apparatus to:
examine columns of the image starting from the first edge towards the second edge until a column fulfilling an efficiency criteria has been found; and
select the column which fulfils the efficiency criteria as the division boundary.

In some embodiments the apparatus comprises computer program code configured to, with the at least one processor, cause the apparatus to:
examine an area of the image to determine a number of contours in the area; and
use the location of the area as the division boundary, if the number of contours is less than a threshold.

In some embodiments the apparatus comprises computer program code configured to, with the at least one processor, cause the apparatus to:
examine areas of the image to determine a number of contours in the area; and
use the location of that area as the division boundary which has the smallest number of contours.

In some embodiments the apparatus comprises computer program code configured to, with the at least one processor, cause the apparatus to:
provide a flag indicative of whether the image has been shifted.

In some embodiments the apparatus comprises computer program code configured to, with the at least one processor, cause the apparatus to:
provide a flag indicative of whether said information of the location of the current division boundary indicates a distance between the current division boundary and a previous division boundary or the edge of the original image.

In some embodiments the apparatus comprises computer program code configured to, with the at least one processor, cause the apparatus to:
provide a flag indicative of whether said information of the location of the division boundary indicates a distance between the division boundary and the first edge or the second edge of the original image.

According to a seventh example, there is provided an apparatus comprising:
means for obtaining an image having a first edge and a second edge;
means for searching a location suitable for a division boundary for dividing the image into a first part and a second part;
means for rearranging the image by exchanging the order of the first part and the second part to obtain a reconstructed original image; and
means for providing an indication of a location of the division boundary.

According to an eight example, there is provided a computer readable storage medium stored with code thereon for use by an apparatus, which when executed by a processor, causes the apparatus to perform:
obtain an image having a first edge and a second edge;
search a location suitable for a division boundary for dividing the image into a first part and a second part;
rearrange the image by exchanging the order of the first part and the second part to obtain a reconstructed original image; and
provide an indication of a location of the division boundary.

The invention claimed is:

1. A method comprising:
receiving an image obtained from an original image, said image having a first edge and a second edge;
receiving an indication that the image comprises an image shifted to improve coding efficiency;
receiving information indicative of a location of a division boundary, said division boundary dividing the image into a first part and a second part; and
based at least partially on the received indication, rearranging the image, wherein the rearranging of the image comprises exchanging an order of the first part and the second part to obtain a reconstructed original image.

2. The method according to claim 1, wherein said information indicative of the location of the division boundary indicates a distance between the division boundary and a first edge of the original image, wherein the method further comprises:
determining that a distance of the division boundary from the second edge of the image is the same as the distance of the division boundary from the first edge of the original image.

3. An apparatus comprising at least one processor; and at least one non-transitory memory including computer program code; the at least one memory and the computer program code configured to, with the at least one processor, cause the apparatus to perform at least the following:
  receive an image obtained from an original image, said image having a first edge and a second edge;
  receive an indication that the image comprises an image shifted to improve coding efficiency;
  receive information indicative of a location of a division boundary, said division boundary dividing the image into a first part and a second part; and
  based at least partially on the received indication, rearrange the image, wherein rearranging the image comprises exchanging an order of the first part and the second part to obtain a reconstructed original image.

4. The apparatus according to claim 3, wherein said computer program code is configured to, with the at least one processor, further cause the apparatus to:
  determine that a distance of the division boundary from the second edge of the image is the same as a distance of the division boundary from a first edge of the original image.

5. The apparatus according to claim 3, wherein said computer program code is configured to, with the at least one processor, further cause the apparatus to:
  determine that a distance between the division boundary and the first edge is smaller than a distance between the division boundary and the second edge; rearrange the image, wherein rearranging the image comprises shifting the second part towards the first edge; and stitch the first part to the other side of the second edge; or
  determine that the distance between the division boundary and the second edge is smaller than the distance between the division boundary and the first edge; rearrange the image, wherein rearranging the image comprises shifting the first part towards the second edge; and stitch the second part to the other side of the first edge.

6. The apparatus according to claim 3, wherein the image is a shifted representation of the original image and wherein the receiving of the indication comprises receiving an indication that the image comprises an image horizontally shifted to improve coding efficiency.

7. The apparatus according to claim 3, wherein said computer program code is configured to, with the at least one processor, further cause the apparatus to:
  receive a flag indicative of whether said information indicative of the location of the division boundary indicates a distance between the division boundary and a first edge or a second edge of the original image.

8. The apparatus according to claim 3, wherein said computer program code is configured to, with the at least one processor, further cause the apparatus to:
  receive a flag indicative of whether said information indicative of the location of the division boundary indicates a distance between the division boundary and a previous division boundary or an edge of the original image.

9. The apparatus according to claim 3, wherein said computer program code is configured to, with the at least one processor, further cause the apparatus to:
  store pixels of the received image to a memory;
  provide references to image pixels of the received image in the memory; and
  rearrange the image, wherein rearranging the image comprises changing the references to address the obtained reconstructed original image.

10. A method comprising:
  obtaining an image having a first edge and a second edge;
  determining whether shifting the image would improve coding efficiency;
  based at least partially on a determination that shifting the image would improve coding efficiency, searching a location suitable for a division boundary for dividing the image into a first part and a second part;
  rearranging the image, wherein the rearranging of the image comprises exchanging an order of the first part and the second part to obtain a reconstructed original image; and
  providing an indication of the location of the division boundary.

11. An apparatus comprising at least one processor and at least one non-transitory memory including computer program code the at least one memory and the computer program code configured to, with the at least one processor, cause the apparatus to perform at least the following:
  obtain an image having a first edge and a second edge;
  determine whether shifting the image would improve coding efficiency;
  based at least partially on a determination that shifting the image would improve coding efficiency, search a location suitable for a division boundary for dividing the image into a first part and a second part;
  rearrange the image, wherein rearranging the image comprises exchanging an order of the first part and the second part to obtain a reconstructed original image; and
  provide an indication of the location of the division boundary.

12. The apparatus according to claim 11, wherein said computer program code is configured to, with the at least one processor, further cause the apparatus to:
  examine an area of the image to determine smoothness of content of the area;
  determine that the smoothness of the content of the area provides better coding efficiency when the division boundary is located at the area; and
  use the location of the area as the location of the division boundary.

13. The apparatus according to claim 11, wherein said computer program code is configured to, with the at least one processor, further cause the apparatus to:
  examine a depth map of the image to search an area having similar depth along a vertical column.

14. The apparatus according to claim 11, wherein said computer program code is configured to, with the at least one processor, further cause the apparatus to:
  examine columns of the image from the first edge to the second edge; and
  select a column which induces a best coding efficiency as the division boundary.

15. The apparatus according to claim 11, wherein said computer program code is configured to, with the at least one processor, further cause the apparatus to:
  examine columns of the image starting from the first edge towards the second edge until a column fulfilling an efficiency criteria has been found; and
  select the column which fulfils the efficiency criteria as the division boundary.

16. The apparatus according to claim 11, wherein said computer program code is configured to, with the at least one processor, further cause the apparatus to:
  examine an area of the image to determine a number of contours in the area; and use the location of the area as the location of the division boundary, when the number of contours is less than a threshold.

17. The apparatus according to claim 11, wherein said computer program code is configured to, with the at least one processor, further cause the apparatus to:

examine areas of the image to determine a number of contours in the area; and use a location of an area as the location of the division boundary which has the smallest number of contours.

18. The apparatus according to claim 11, wherein said computer program code is configured to, with the at least one processor, further cause the apparatus to:

provide a flag indicative of whether the image has been shifted.

19. The apparatus according to claim 11, wherein said computer program code is configured to, with the at least one processor, further cause the apparatus to:

provide a flag indicative of whether said indication of the location of division boundary indicates a distance between the division boundary and a previous division boundary or one of the first or second edge of the image.

20. The apparatus according to claim 11, wherein said computer program code is configured to, with the at least one processor, further cause the apparatus to:

provide a flag indicative of whether said indication of the location of the division boundary indicates a distance between the division boundary and the first edge or the second edge of the image.

* * * * *